United States Patent
Li

(10) Patent No.: US 9,794,204 B2
(45) Date of Patent: Oct. 17, 2017

(54) METHOD AND APPARATUS FOR FORWARDING MULTIMEDIA MESSAGE

(71) Applicant: ZTE Corporation, Shenzhen, Guangdong (CN)

(72) Inventor: Yun Li, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 150 days.

(21) Appl. No.: 14/655,307

(22) PCT Filed: Aug. 14, 2013

(86) PCT No.: PCT/CN2013/081482
§ 371 (c)(1),
(2) Date: Jun. 24, 2015

(87) PCT Pub. No.: WO2013/189335
PCT Pub. Date: Dec. 27, 2013

(65) Prior Publication Data
US 2015/0326518 A1    Nov. 12, 2015

(30) Foreign Application Priority Data

Dec. 27, 2012  (CN) .......................... 2012 1 0579540

(51) Int. Cl.
*G06F 15/16*    (2006.01)
*H04L 12/58*    (2006.01)
(Continued)

(52) U.S. Cl.
CPC ............ *H04L 51/10* (2013.01); *H04L 51/066* (2013.01); *H04L 51/14* (2013.01); *H04L 69/04* (2013.01); *H04W 4/12* (2013.01); *H04W 4/18* (2013.01)

(58) Field of Classification Search
CPC ........ H04L 51/10; H04L 51/066; H04L 69/04; H04W 4/12; H04W 4/18
(Continued)

(56) References Cited

U.S. PATENT DOCUMENTS

2006/0270425 A1    11/2006   Lee
2009/0316774 A1    12/2009   Yang
(Continued)

FOREIGN PATENT DOCUMENTS

CN         1870779 A      11/2006
CN       101197823 A       6/2008
(Continued)

OTHER PUBLICATIONS

Supplementary European Search Report in European application No. 13807549.4, dated Oct. 7, 2015.
(Continued)

*Primary Examiner* — Wing F Chan
*Assistant Examiner* — Joseph Maniwang
(74) *Attorney, Agent, or Firm* — Oppedahl Patent Law Firm LLC

(57) ABSTRACT

A method and an apparatus for forwarding a multimedia message are provided. The method for forwarding a multimedia message includes that a gateway receives a compressed multimedia message from a terminal, the gateway parses the received multimedia message to acquire a compression type parameter which is adopted for the compression at the terminal and is carried in the received multimedia message, the gateway decompresses the received multimedia message according to the compression type parameter to obtain a decompressed multimedia message, and the decompressed multimedia message is sent to an MMS center. According to the technical solution of the present disclosure, the gateway decompresses the received multimedia message (Continued)

and then sends the decompressed multimedia message to the MMS center in a conventional way, and the multimedia message downloaded from the MMS center is sent to the terminal in a compression form, so that the waste of network resources can be avoided effectively and the speed of uploading and downloading the multimedia message is increased.

10 Claims, 3 Drawing Sheets

(51) Int. Cl.
  *H04W 4/12* (2009.01)
  *H04L 29/06* (2006.01)
  *H04W 4/18* (2009.01)

(58) Field of Classification Search
  USPC .................................................. 709/206, 247
  See application file for complete search history.

(56) References Cited

U.S. PATENT DOCUMENTS

| | | |
|---|---|---|
| 2011/0075676 A1 | 3/2011 | Gopalakrishnan |
| 2011/0125864 A1 | 5/2011 | Zhang |
| 2012/0254417 A1 | 10/2012 | Luna |
| 2015/0249727 A1 | 9/2015 | Luna |

FOREIGN PATENT DOCUMENTS

| | | |
|---|---|---|
| CN | 101345776 A | 1/2009 |
| CN | 101610476 A | 12/2009 |
| CN | 101778496 A | 7/2010 |
| CN | 101815279 A | 8/2010 |
| CN | 101977361 A | 2/2011 |
| WO | 2008144926 A1 | 12/2008 |

OTHER PUBLICATIONS

International Search Report in international application No. PCT/CN2013/081482, dated Nov. 28, 2013.
English Translation of the Written Opinion of the International Search Authority in international application No. PCT/CN2013/081482, dated Nov. 28, 2013.

METHOD AND APPARATUS FOR FORWARDING MULTIMEDIA MESSAGE

TECHNICAL FIELD

The present disclosure relates to the field of communication application, in particular to a method and an apparatus for forwarding a multimedia message.

BACKGROUND

A Multimedia Message service (MMS) is the most popular means in the mobile communication. With the wide application of the MMS, the average traffic of mobile data network users and the increase of the user number have become unaffordable to the traditional voice network, a data service gradually occupies a large number of network resources, and traffic bottlenecks always occurs in a data core network; moreover, the application of the network resources is increasingly tense; therefore, how to save a network bandwidth, increase a user access speed, and improve the user experience has become the urgent problems to be solved by the operators.

At present, it may take about one hour for a terminal to send or receive a multimedia message of 120 KB, and network congestion usually occurs because an MMS center needs to transmit many multimedia messages at the same time. To solve the problems of network congestion and the like, generally, the existing way is to continuously expand the bandwidth of a mobile network, but this way may waste many resources while solving the problems above.

Furthermore, in order to increase the communication speed of the multimedia message in the network, a user usually adopts a low-quality multimedia message if the network bandwidth cannot be expanded. This is because the low-quality multimedia message is usually small in data size and relatively high in network transmission speed. Obviously, this way, in which the speed is improved but the essential quality of the multimedia message is reduced, cannot meet the requirements of the user on the quality and the speed at the same time, and may damage the MMS as time passes.

In the prior art, the problems of how to save the network bandwidth, increase the speed of sending and receiving a multimedia message, and improve the processing of mobile data traffic and the like are not really solved. If a multimedia message to be sent or received can be compressed or decompressed by a gateway, the multimedia message can be compressed to be sent to meet the requirements of an MMS center of reducing the data traffic of a wireless side, accelerating user access and saving the network bandwidth.

SUMMARY

The embodiments of the present disclosure provide methods and systems for forwarding a multimedia message, in order to effectively improve the speed of sending and receiving a multimedia message and save a network bandwidth.

To solve the technical problem, the technical solution provided by the embodiments of the present disclosure is as follows:

In one aspect, a method for forwarding a multimedia message is provided, which includes that a gateway receives a compressed multimedia message from a terminal; the gateway parses the compressed multimedia message to acquire a compression type parameter which is adopted for the compression at the terminal and is carried in the compressed multimedia message; the gateway decompresses the compressed multimedia message according to the compression type parameter to obtain a decompressed multimedia message; and the decompressed multimedia message is sent to an MMS center.

The step that the gateway decompresses the compressed multimedia message according to the compression type parameter may include that the gateway looks for a compression/decompression engine in compression/decompression engines pre-provided in an engine library according to the compression type parameter, and calls the found compression/decompression engine to decompress the compressed multimedia message.

In another aspect, an apparatus for forwarding a multimedia message is provided, which includes that a first receiving module which is configured to receive a compressed multimedia message from a terminal; a first parsing module which is configured to parse the compressed multimedia message to acquire a compression type parameter which is adopted for the compression at the terminal and is carried in the compressed multimedia message; a decompression module which is configured to decompress the compressed multimedia message according to the decompression type parameter to obtain a decompressed multimedia message; and a sending module which is configured to send the decompressed multimedia message to an MMS center.

The apparatus for forwarding a multimedia message may further include that a first engine library which is pre-provided with various compression/decompression engines and corresponding compression type parameters. Correspondingly, the decompression module may be further configured to look for a compression/decompression engine in the first engine library according to the compression type parameter, and call the found compression/decompression engine to decompress the compressed multimedia message.

In another aspect, a method for forwarding a multimedia message is provided, which includes that a gateway receives a multimedia message downloading request from a terminal; the gateway parses the multimedia message downloading request to acquire a compression type parameter which is supported by the terminal and is carried in the multimedia message downloading request, and records the compression type parameter; the gateway removes the compression type parameter from the multimedia message downloading request to obtain a multimedia message request from which the compression type parameter has been removed and sends the multimedia message request to an MMS center; and the gateway receives a multimedia message requested by the terminal and fed back from the MMS center, compresses the multimedia message fed back from the MMS center according to the compression type parameter, and forwards the compressed multimedia message to the terminal.

The multimedia message downloading request may further carry an identifier of the terminal sending the multimedia message downloading request; correspondingly, the step that the gateway parses the multimedia message downloading request to acquire a compression type parameter which is supported by the terminal and is carried in the multimedia message request and records the compression type parameter may include that the gateway parses the multimedia message downloading request to acquire the compression type parameter supported by the terminal and the identifier of the terminal which are carried in the multimedia message request, and records the identifier of the terminal, the compression type parameter and a corresponding relationship between the identifier of the terminal and the compression type parameter.

The step that the gateway compresses the multimedia message fed back from the MMS center according to the compression type parameter may include that the gateway looks for a compression/decompression engine in various compression/decompression engines pre-provided in an engine library according to the compression type parameter, and calls the found compression/decompression engine to compress the multimedia message fed back from the MMS center.

In another aspect, an apparatus for forwarding a multimedia message is provided, which includes that a second receiving module which is configured to receive a multimedia message downloading request from a terminal; a second parsing module which is configured to parse the multimedia message downloading request to acquire a compression type parameter which is supported by the terminal and is carried in the multimedia message downloading request and record the compression type parameter; a forwarding module which is configured to remove the compression type parameter from the multimedia message downloading request to obtain a multimedia message request from which the compression type parameter has been removed and send the multimedia message request to an MMS center; and a compression module which is configured to receive a multimedia message requested by the terminal and fed back from the MMS center, to compress the multimedia message fed back from the MMS center according to the recorded compression type parameter, and to forward the compressed multimedia message to the terminal.

The multimedia message downloading request may further carry an identifier of the terminal sending the multimedia message downloading request; the second parsing module may be configured to parse the multimedia message downloading request to acquire the compression type parameter supported by the terminal and an identifier of the terminal which are carried in the multimedia message downloading request, and to record the identifier of the terminal, the compression type parameter and a corresponding relationship between the identifier of the terminal and the compression type parameter.

The apparatus for forwarding a multimedia message may further include a second engine library which is pre-provided with various compression/decompression engines and corresponding compression type parameters. Correspondingly, the decompression module may be further configured to look for a compression/decompression engine in the second engine library according to the compression type parameter, and call the found compression/decompression engine to compress the multimedia message fed back from the MMS center.

The technical solutions of the embodiments of the present disclosure have the following advantages:

1) A compressed multimedia message is received from a terminal, and then is decompressed according to a compression type parameter carried in a multimedia message and is subsequently sent to the MMS center; when the multimedia message is received from the MMS center, the multimedia message is compressed and then sent to the terminal, so that less network bandwidth is wasted, and the speed of sending the multimedia message is increased;

2) According to the processing of a multimedia message received from a terminal and a compression type parameter carried in a multimedia message request, a gateway can compress/decompress the multimedia message without changing an MMS center, so that the speed of uploading or downloading the multimedia message in the network is effectively improved, and the application of network resources is saved.

DETAILED DESCRIPTION

To describe the technical problem to be solved, the technical solution and the advantages of the present disclosure more clearly, the present disclosure is described below in combination with the accompanying drawings and the embodiments in detail.

To solve the problems that the network speed is decreased due to too much network traffic wasted when a terminal sends or receives a multimedia message, and the multimedia message cannot be sent to or received from a target terminal quickly and other problems, a method and an apparatus for forwarding a multimedia message are provided. The method includes: a gateway receives from the terminal a compressed multimedia message which contains a compression type parameter, decompresses the received compressed multimedia message according to the compression type parameter and sends the decompressed multimedia message to an MMS center; and the method further includes that the gateway receives from the terminal a multimedia message request which contains the compression type parameter, records the compression type parameter and then sends the multimedia message request to the MMS center; and the gateway receives a feedback from the MMS center and then compresses the multimedia message and forwards the compressed multimedia message to the terminal sending the multimedia message request.

Figure 1:
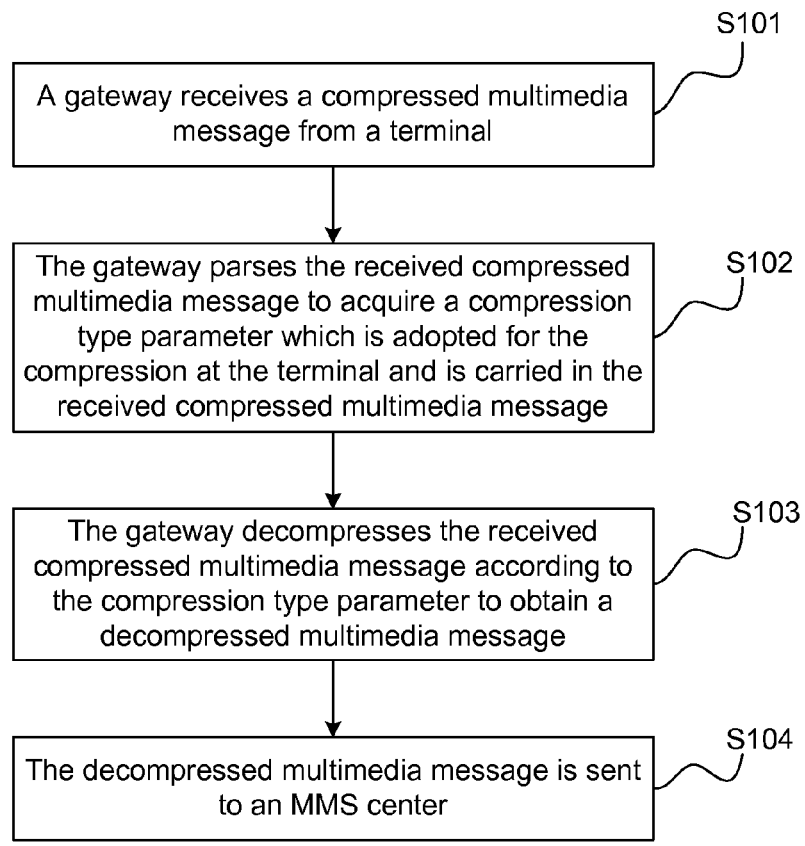
FIG. 1 is a flowchart of a method in a first embodiment of the present disclosure.

As shown in FIG. 1 which is a flowchart of a method in a first embodiment of the present disclosure; in the embodiment, the method for forwarding a multimedia message includes:

S101: a gateway receives a compressed multimedia message from a terminal;

in the embodiment, before the gateway receives the multimedia message from the terminal, the terminal has compressed the substantial content of the multimedia message and adds the adopted compression type parameter into the message header of the multimedia message before sending the compressed multimedia message, wherein the compression engine of the terminal may use gzip, deflate, compress, ppmd and other compression algorithms. Of course, the compression algorithms which can be used by the embodiment of the present disclosure are not limited to those;

S102: the gateway parses the multimedia message to acquire the compression type parameter which is carried in the multimedia message and is used for the compression at the terminal;

in the embodiment, the compression type is acquired by parsing the message header of the multimedia message through the compressed multimedia message received in step S101, so that the gateway selects a proper decompression format for the compressed multimedia message before sending it to the MMS center, and the gateway will scan the information carried in the message header automatically, and may read the received compressed multimedia message in a compression file form when scanning the compression type parameter contained in the message header;

S103: the gateway decompresses the multimedia message according to the compression type parameter to obtain a decompressed multimedia message;

in the embodiment, the step S103 that the compressed multimedia message is decompressed according to the compression type parameter of the compressed multimedia message parsed in step S102 further includes that the gateway looks for a corresponding compression/decompression engine in the compression/decompression engines pre-provided in an engine library according to the compression type parameter, and calls the found compression/decompression engine to decompress the multimedia message. The gateway may further carry out other conventional processing for the multimedia message after decompressing the multimedia message, such as adding the IP address of the terminal, the number of the terminal or a receiving port number and the like to the message header of the multimedia message. In the step S103, the compression type parameter is further removed from the multimedia message; and S104: the decompressed multimedia message is sent to the MMS center.

The first embodiment is further described below through an application embodiment.

For example, a user operates a terminal to edit a multimedia message of 275 KB on a user interface and clicks SEND; the terminal, after receiving the sent signal, automatically compresses the edited multimedia message in a gzip format to compress the multimedia message to 120 KB, then sends the compressed multimedia message to the gateway and further adds a compression type parameter adopting a gzip format to the message header of the multimedia message; in this way, the traffic generated between the terminal and the gateway when the multimedia message is sent is actually 120 KB.

Firstly, the gateway receives the multimedia message which has been compressed to 120 KB by the terminal, looks for an engine in a corresponding gzip format in the compression/decompression engines pre-provided in an engine library according to the compression type parameter in the gzip format, and calls the found engine in the gzip format to decompress the multimedia message to the original 275 KB; during the decompression, the message header of the multimedia message is subjected to conventional processing, such as adding the IP address of the terminal, the number of the terminal, a receiving port number and the like, and finally, the decompressed multimedia message is sent to the MMS center.

Through the description of the first embodiment, the embodiment proposes that the essential content of the multimedia message is compressed, and the compressed multimedia message is decompressed according to the adopted compression type parameter added to the message header of the compressed multimedia message and is then sent to the MMS center; the sending speed of the multimedia message is increased by receiving the compressed multimedia message, and the multimedia message is sent to the MMS center conventionally by decompressing the compressed multimedia message. For the MMS center, the gateway decompresses the multimedia message and sends the decompressed multimedia message to the MMS center, so that nothing is changed in the process of sending the multimedia message to the MMS center, namely, the gateway implements a transparent working way; after a user completes editing the multimedia message in a normal way, the multimedia message is compressed automatically in the background and is then sent to the gateway; the gateway uploads the multimedia message to the MMS center on the premise of reducing the traffic, increasing the sending speed and not changing the receiving condition of the MMS center. In other words, the technical solution of the embodiment of the present disclosure saves the network bandwidth on a wireless side, namely, saving the wireless network bandwidth between a wireless terminal and a gateway.

Figure 2:
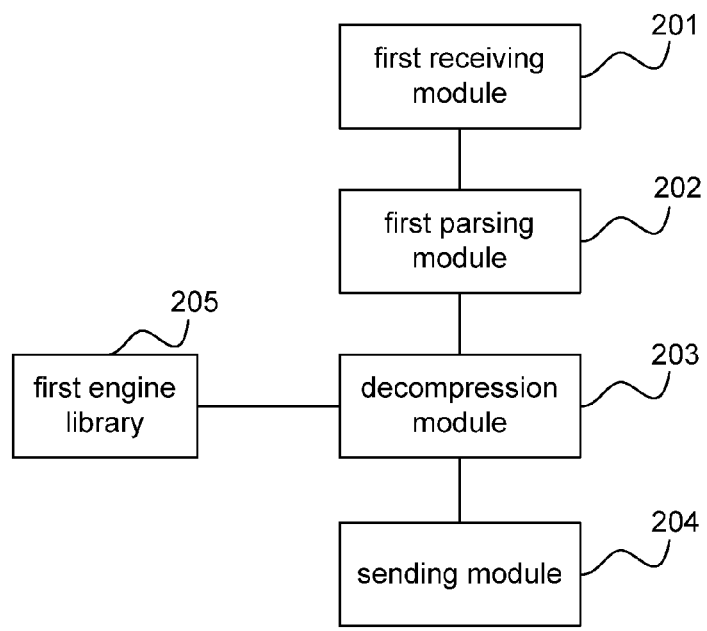
FIG. 2 is a diagram showing the structure of an apparatus in a second embodiment of the present disclosure.

In addition, the compression operation on the multimedia message may be directly executed by default on a terminal side, and the compression operation on the multimedia message of the user is completed automatically when the user is not aware of such a compression operation. Under these conditions, the compression of the multimedia message may cause a loss. In order to ensure the data security of the multimedia message maximally, the compression operation on the multimedia message may be set to be not started until an instruction is received from the user after an inquiry is made for the user, or the compression operation on the multimedia message is terminated by the user. As shown in FIG. 2, which is a diagram showing the structure of an apparatus in a second embodiment of the present disclosure, in the embodiment, an apparatus for forwarding a multimedia message is arranged in a gateway or an external transceiving apparatus connected with the gateway, but this embodiment is not limited to this. The apparatus includes a first receiving module 201, a first parsing module 202, a decompression module 203, a sending module 204 and a first engine library 205.

The first receiving module 201 is configured to receive a compressed multimedia message from a terminal, here, the terminal has compressed the substantial content of the multimedia message and adds the adopted compression type parameter into the message header of the multimedia message when sending the multimedia message, wherein the terminal may adopt gzip, deflate, compress, ppmd and other compression algorithms. Of course, the compression algorithms which may be adopted by the embodiment of the present disclosure are not limited to those.

The first parsing module 202 is configured to parse the multimedia message to acquire the compression type parameter which is carried in the multimedia message and is used for the compression at the terminal.

In the embodiment, after receiving the compressed multimedia message received in the first receiving module 201, the first parsing module 202 may scan all the information carried in the message header automatically, and then parses the message header of the multimedia message to acquire the compression type in order that a proper decompression format is selected for the compressed multimedia message to decompress the multimedia message before the multimedia message is sent to the MMS center; and when the message header is scanned and found to contain the compression type parameter, the received compressed multimedia message may be read in a corresponding compression file form.

The decompression module 203 is configured to decompress the multimedia message according to the compression type parameter to obtain a decompressed multimedia message, and is further configured to look for a corresponding compression/decompression engine in the engine library 205 according to the compression type parameter and call the found compression/decompression engine to decompress the multimedia message; and after decompressing the multimedia message, the decompression module 203 may further carry out other conventional processing for the multimedia message, such as adding the IP address or the number of the terminal and the like to the message header of the multimedia message. The decompression module 203 is further configured to remove the compression type parameter from the multimedia message.

The sending module 204 is configured to send the compressed multimedia message to the MMS center.

The first engine library 205 is configured to be pre-provided with various compression/decompression engines and corresponding compression type parameters.

A second embodiment is further described as follows:

the receiving module 201 receives the compressed multimedia message from the terminal, wherein the terminal further adds the adopted compression type parameter to the message header of the multimedia message, and further sends the received compressed multimedia message to the parsing module 202; the parsing module 202 analyzes the compression format of the received compressed multimedia message according to the compression type parameter carried in the message header of the compressed multimedia message, and sends the parsing result to the decompression module 203; the decompression module 203 looks for a corresponding compression/decompression engine in the compression/decompression engines pre-provided in the engine library 205 according to the parsing result of the parsing module 202 and calls the found compression/decompression engine to decompress the multimedia message, at the same time, the decompression module 203 carries out conventional processing for the message header of the multimedia message, such as inserting the address or number of the terminal; and finally, the decompression module 203 sends the decompressed multimedia message to the sending module 204, and the sending module 204 sends the decompressed multimedia message to the MMS center.

In the actual application, the first receiving module 201 and the sending module 204 may be implemented by a transceiver of a gateway or an external transceiving apparatus connected with the gateway; the first parsing module 202 and the decompression module 203 may be implemented by a Central Processing Unit (CPU), a Digital Signal Processor (DSP) or a Field-Programmable Gate Array (FPGA) of the gateway or the external transceiving apparatus connected with the gateway; and the first engine library 205 is stored in the memory of the gateway or the external transceiving apparatus connected with the gateway.

Figure 3:
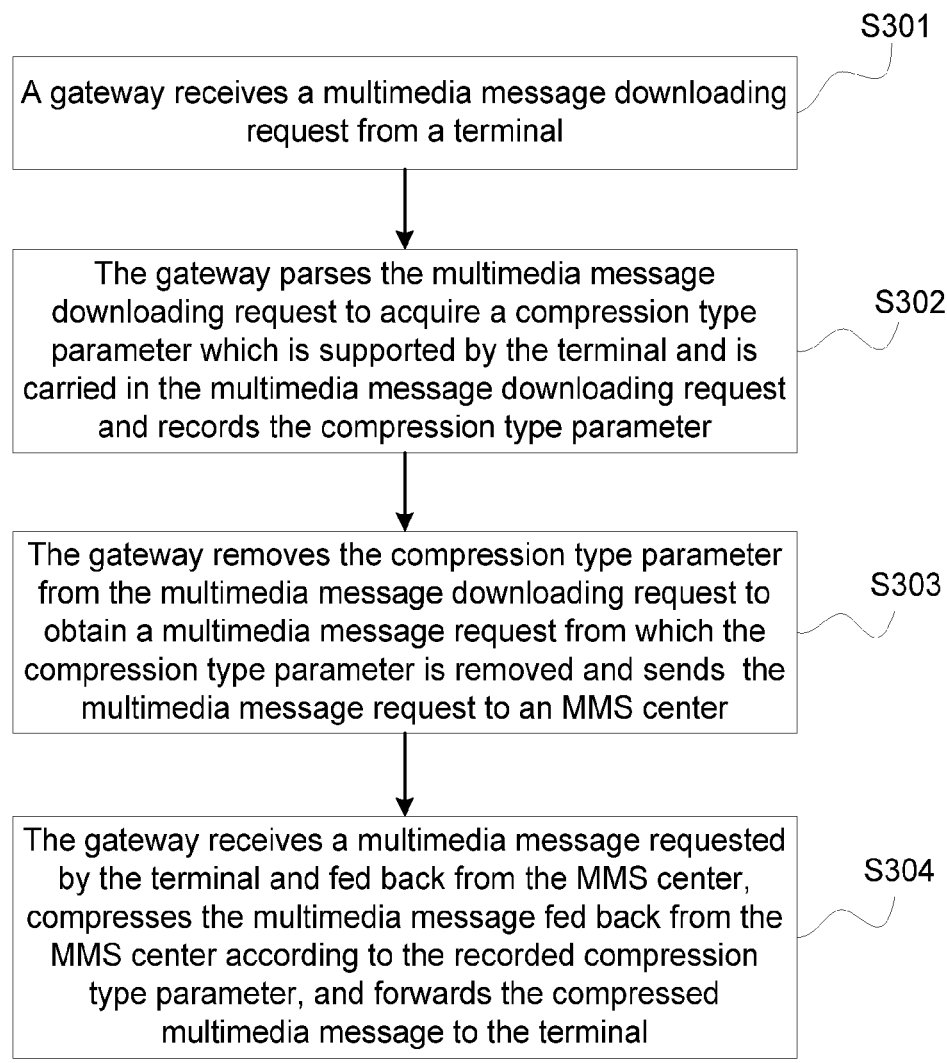
FIG. 3 is a flowchart of a method in a third embodiment of the present disclosure.

As shown in FIG. 3, which is a flowchart of a method in a third embodiment of the present disclosure, in the embodiment, a method for forwarding a multimedia message includes:

S301: a gateway receives a multimedia message downloading request from a terminal, wherein the multimedia message downloading request carries a compression type parameter supported by the terminal and further carries the identifier of the terminal sending the multimedia message downloading request;

in the embodiment, the gateway in step S301 may receive the multimedia message downloading request from a plurality of terminals, so that the compression type parameter supported by each terminal and the identifier of each terminal need to be added into the request message header of the multimedia message request; the terminal adds the compression type parameter supported by itself and its identifier to the request message header of the multimedia message request in order to confirm whether the compression type supported by the terminal can be supported by the gateway, thereby ensuring that traffic can be reduced when the terminal receives the multimedia message and the multimedia message can be received from the MMS center legally. The request message header of each multimedia message request can carry a plurality of compression type parameters supported by the terminal;

S302: the gateway parses the multimedia message downloading request to acquire the compression type parameter which is supported by the terminal and carried in the multimedia message request and records it;

step S302 further includes that the gateway parses the multimedia message downloading request to acquire the compression type parameter supported by the terminal and the identifier of the terminal which are carried in the multimedia message downloading request, and records the identifier of the terminal, the compression type parameter and a corresponding relationship between the identifier of the terminal and the compression type parameter;

in the embodiment, in step S302, specifically, parsing the multimedia message downloading request by the gateway is parsing the message header of the multimedia message request to acquire the compression type and the identifier of the terminal and recording the acquired compression type and the identifier of the terminal in a database of the gateway. By parsing the multimedia message request and recording the parsing result in the database in step S302, the gateway can effectively determine and apply the compression type supported by the terminal, so that the network traffic and the network resource bandwidth can be controlled for the subsequent forwarding of the multimedia message sent from the MMS center to the terminal;

S303: the gateway removes the compression type parameter from the multimedia message downloading request to obtain a multimedia message request from which the compression type parameter has been removed, and sends the multimedia message request to the MMS center;

in the embodiment, in step S303, the compression type parameter carried in the multimedia message downloading request recorded in step S302 is removed from the multimedia message downloading request in order to ensure the legalization of sending the multimedia message request to the MMS center, because the existing MMS center only receives a name in an un-compressed format and a corresponding name suffix in a message header, as a result, adding the compression type parameter to the message header of the multimedia message downloading request does not meet the receiving condition of the MMS center, therefore, in step S303, the gateway needs to delete the compression type parameter from the multimedia message downloading request to ensure that the multimedia message is sent without changing the condition required by the MMS center; and S304: the gateway receives a multimedia message requested by the terminal and fed back from the MMS center, compresses the multimedia message according to the recorded compression type parameter, and forwards the compressed multimedia message to the terminal. Step S304 further includes that the gateway looks for a corresponding compression/decompression engine in the various compression/decompression engines pre-provided in the engine library according to the recorded compression type parameter, and calls the found compression/decompression engine to compress the multimedia message.

In the embodiment, in step S304, the gateway receives the multimedia message that the terminal requests to download from the MMS center and is sent from the MMS center, looks for a corresponding compression/decompression engine in the various compression/decompression engines pre-provided in the engine library according to the compression type parameter recorded in the database of the gateway in step S302, and calls the found compression/decompression engine to compress the multimedia message; the compressed multimedia message is sent to the terminal corresponding to the identifier of the terminal according to the identifier of the terminal recorded in the database; the multimedia message sent from the MMS center is compressed in step S304, so that the volume of the multimedia message is reduced, the speed of downloading the multimedia message is increased for the terminal, and wireless traffic and bandwidth are saved when the terminal receives and sends the multimedia message. In other words, the network bandwidth of a wireless side is saved, namely, the wireless network bandwidth between a wireless terminal and the gateway is saved.

In step S304, the adopted compression type parameter is further added to the compressed multimedia message and forwarded to the terminal together with the compressed multimedia message; in one aspect, the situation that the multimedia message is compressed can be informed to the terminal to prompt the terminal to decompress the multimedia message before displaying it. In another aspect, the request message header of each multimedia message request in step 301 may carry a plurality of compression type parameters supported by the terminal, so that the gateway selects one compression type parameter to complete the compression, and needs to tell the terminal which compression way is adopted, and the terminal needs to adopt a corresponding way for decompression.

Figure 4:
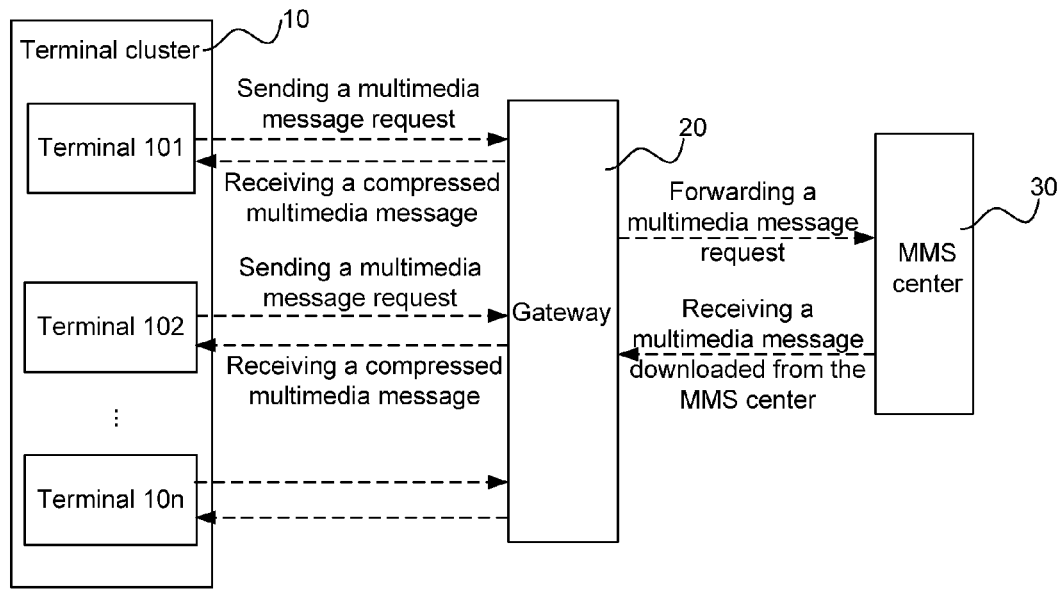
FIG. 4 is a first diagram of an embodiment of the present disclosure.

As shown in FIG. 4, a third embodiment is further described below through an application embodiment.

A gateway 20 receives a multimedia message request from a terminal cluster 10. For example, the gateway 20 receives from a terminal 101a multimedia message request which carries a compression type parameter in a gzip compression format and an identifier 123 of the terminal 101; the gateway 20 further receives from a terminal 102a multimedia message request which carries a compression type parameter in a deflate compression format and an identifier 456 of the terminal 102; the gateway 20 further records the compression type parameter in the gzip format and the identifier 123 of the terminal which are carried in the multimedia message request received from the terminal 101 and the compression type parameter in the deflate format and the identifier 456 of the terminal which are carried in the multimedia message request received from the terminal 102 to the database of the gateway 20 respectively, deletes the compression type parameter in the gzip format in the multimedia message request of the terminal 101 and the compression type parameter in the deflate format in the multimedia message request of the terminal 102 and then sends the multimedia message requests to the MMS center 30.

After receiving the multimedia message requests of the terminals 101 and 102 from the gateway 20, the MMS center 30 feeds the multimedia messages that the terminals 101 and 102 request to download back to the gateway 20; when the MMS center 30 feeds back the multimedia messages, the corresponding multimedia messages may carry corresponding identifiers of the terminals.

After receiving one multimedia message, the gateway 20 parses the multimedia message to obtain an identifier 123 of the terminal related to the multimedia message, queries the database of the gateway 20 according to the identifier 123 of the terminal to obtain that the compression type parameter corresponding to the identifier 123 of the terminal is in a gzip compression format, looks for a corresponding gzip compression/decompression engine in the various compression/decompression engines pre-provided in the engine library of the gateway 20 according to the gzip compression format, compresses the multimedia message through the gzip compression/decompression engine, and sends the compressed multimedia message to the terminal 101 corresponding to the identifier 123 of the terminal.

After receiving another multimedia message, the gateway 20 parses the multimedia message to obtain an identifier 456 of the terminal related to the multimedia message, queries the database of the gateway 20 according to the identifier 456 of the terminal to obtain that the compression type parameter corresponding to the identifier 456 of the terminal is in a deflate compression format, looks for a corresponding deflate compression/decompression engine in the various compression/decompression engines pre-provided in the engine library of the gateway 20 according to the deflate compression format, compresses the multimedia message through the deflate compression/decompression engine, and sends the compressed multimedia message to the terminal 102 corresponding to the identifier 456 of the terminal.

At present, by reducing the traffic transmitted between an SP server and a user, the specification of a network server defines a message header receiving field and a message header sending field, wherein the message head receiving field specifies that an encoding mechanism which can be understood by a client supports the compression of traffic, and the message header sending field specifies that a server returns the compressed content to a client browser. If all the multimedia messages to be received or sent are delivered to the server to be specified for compression, the transceiving of the multimedia messages may be also slowed down, and the applied server may reduce the essential quality of the multimedia message to be downloaded. In the embodiment of the present disclosure, the compression or decompression is carried out when the gateway uploads or downloads the multimedia message to the MMS center on the terminal without affecting the normal interaction, so that the network traffic is reduced and the waste of network bandwidth is greatly reduced. In other words, the network bandwidth on the wireless side is saved, namely, the wireless network bandwidth between the wireless terminal and the gateway is saved, and the transceiving speed of the multimedia message is effectively increased.

Figure 5:
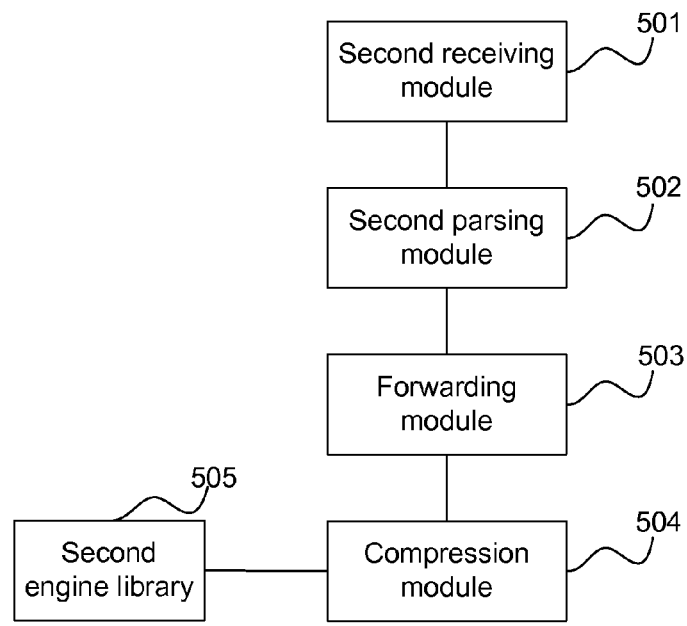
FIG. 5 is a diagram showing the structure of an apparatus in a fourth embodiment of the present disclosure.

As shown in FIG. 5, which is a diagram showing the structure of an apparatus in a fourth embodiment of the present disclosure, in the embodiment, an apparatus for forwarding a multimedia message is located in a gateway or in an external transceiving apparatus connected with the gateway, but the present disclosure is not limited to this. The apparatus includes:

a second receiving module 501 which is configured to receive a multimedia message downloading request from a terminal, wherein the multimedia message downloading request carries a compression type parameter supported by the terminal and further carries the identifier of the terminal sending the multimedia message downloading request.

In the embodiment, the second receiving module 501 may receive multimedia message downloading requests from a plurality of terminals, and each request carries a compression type parameter and the identifier of the terminal which are added in the message header of the multimedia message downloading request.

The second parsing module 502 is configured to parse the multimedia message downloading request to acquire the compression type parameter supported by each terminal and carried in the multimedia message downloading request and record the compression type parameter; the second parsing module 502 is further configured to parse the multimedia message downloading request to acquire the compression type parameter supported by the terminal and the identifier of the terminal which are carried in the multimedia message downloading request, and record the identifier of the terminal, the compression type parameter and a corresponding relationship between the identifier of the terminal and the compression type parameter.

In the embodiment, the second parsing module 502 parses the multimedia message downloading request to obtain the compression type and the corresponding identifier of the terminal in the message header of the multimedia message request, and records the obtained compression type and the corresponding identifier of the terminal therein; the second parsing module 502 records the identifier of the terminal, the compression type parameter and the corresponding relationship between the identifier of the terminal and the compression type parameter in the parsing result therein, so that the compression type supported by the terminal can be determined effectively, and the network traffic and the network resource bandwidth can be controlled for the subsequent forwarding of the multimedia message sent from the MMS center to the terminal.

The forwarding module 503 is configured to remove the compression type parameter from the multimedia message downloading request to obtain a multimedia message request from which the compression type parameter has been removed, and sends the multimedia message request to the MMS center.

In the embodiment, the forwarding module 503 removes the recorded compression type parameter carried in the multimedia message downloading request from the multimedia message downloading request in order to ensure the legalization of sending the multimedia message request to the MMS center, because the existing MMS center only receives a name in an un-compressed format and a corresponding name suffix in a message header, as a result, adding the compression type parameter into the message header of the multimedia message request does not meet the receiving condition of the MMS center. Therefore, the forwarding module 503 deletes the compression type parameter from the multimedia message downloading request to ensure that the multimedia message is sent without changing the condition required by the MMS center.

The compression module 504 is configured to receive a multimedia message which is requested by the terminal and is fed back from the MMS center, and forwards the compressed multimedia message to the terminal. The compression module 504 is further configured to look for a corresponding compression/decompression engine in various compression/decompression engines pre-provided in the second engine library 505 according to the recorded compression type parameter, and calls the found compression/decompression engine to compress the multimedia message.

The second engine library 505 is configured to be one which is pre-provided with various compression/decompression engines and the corresponding compression type parameters.

In the embodiment, the compression module 504 receives the multimedia message that the terminal requests to download from the MMS center and is sent from the MMS center, looks for a corresponding compression/decompression engine in the various compression/decompression engines pre-provided in the second engine library 505 according to the compression type parameter recorded in the second parsing module 502, and calls the found compression/decompression engine to compress the multimedia message; the compressed multimedia message is sent to the terminal corresponding to the identifier of the terminal according to the identifier of the terminal recorded; the compression module 504 compresses the multimedia message sent from the MMS center, so that the volume of the multimedia message is reduced, the speed of downloading the multimedia message by the terminal is increased, and wireless traffic and bandwidth are saved when the terminal receives and sends the multimedia message. In other words, the network bandwidth on a wireless side is saved, namely, the wireless network bandwidth between a wireless terminal and a gateway is saved. The compression module 504 further adds the adopted compression type parameter to the compressed multimedia message and forwarded to the terminal together with the compressed multimedia message. In one aspect, the fact that the multimedia message is compressed can be informed to the terminal to prompt the terminal to decompress the multimedia message before displaying it. In another aspect, the request message header of each multimedia message request recorded by the second parsing module 502 may carry a plurality of compression type parameters supported by the terminal, so the compression module 504 will select one compression type parameter to complete the compression, at the moment, the compression module 504 needs to tell the terminal which compression way is adopted, and the terminal needs to adopt the corresponding way for decompression.

A fourth embodiment is further described below by an application example.

The second receiving module 501 receives a multimedia message request from a terminal and sends the multimedia message request to the second parsing module 502, wherein the multimedia message request carries a compression type parameter in a gzip format and a corresponding identifier 123456 of the terminal; the second parsing module 502 parses the compression type parameter in the gzip format and the corresponding identifier 123456 of the terminal from the request message header of the multimedia message request and records the gzip format and the corresponding identifier 123456 of the terminal at the same time, and further sends the multimedia message request to the forwarding module 503; and the forwarding module 503 deletes the recorded compression type parameter in the gzip format from the request message header of the multimedia message request and then sends the multimedia message request to the MMS center.

After receiving the multimedia message request from the forwarding module 503, the MMS center sends the requested multimedia message of 100 KB; the compression module 504 receives the multimedia message of 100 KB from the MMS center, looks for a corresponding gzip compression/decompression engine in various compression/decompression engines pre-provided in the second engine library 505 according to the compression type parameter in the gzip format recorded by the second parsing module 502, and calls the found gzip compression/decompression engine to compress the multimedia message. The multimedia message of 100 KB is compressed to 60 KB (the size may be different according to different compression types, compression algorithms and compression degrees); and the compressed multimedia message is sent to the terminal corresponding to the identifier of the terminal according to the recorded identifier of the terminal.

In the actual application, the second receiving module 501 and the forwarding module 503 may be implemented by a transceiver of a gateway or an external transceiving apparatus connected with the gateway; the second parsing module 502 and the compression module 504 may be implemented by a CPU, a DSP or an FPGA of a gateway or an external transceiving apparatus connected with the gateway; and the second engine library 505 is stored in the memory of the gateway or the external transceiving apparatus connected with the gateway.

Many functional components described herein are called modules in order to emphasize the independence of its implementation way more particularly.

In the embodiments of the present disclosure, the modules can be realized by software in order to be executed by various processors. For example, an identified executable code module can include one or more physical or logic blocks of a computer instruction, namely, it can be constructed as an object, a process or a function. Even so, the executable code of the identified module does not need to be located together but can include different instructions stored at different physical positions; and these instructions construct the module and implement the objective specified by the module when being combined together logically.

Actually, the executable code module can be one or more instructions, and can be even distributed on multiple different code segments, in different programs and over multiple storage devices. Similarly, operational data can be identified in a module and be realized according to any appropriate form and is organized in any data structure of appropriate type. The operational data can be collected as a single data set or be distributed at different locations (including on different storage devices), and can be at least partially stored on the system or the network only as an electronic signal.

When the modules can be realized through software, in consideration of the level of the existing hardware process, those skilled in the art can build a corresponding hardware circuit to realize the corresponding function for the modules which can be realized by software if the cost is not considered. The hardware circuit includes a conventional Very-Large-Scale Integration (VLSI) circuit or a gate array and an existing semiconductor, such as a logic chip, transistor, or other discrete components. The modules can be further implemented by a programmable hardware device, such as a field programmable gate array, a programmable array logic and a programmable logic device.

In the embodiment of each method of the present disclosure, the serial number of each step cannot be used for limiting its sequence; and the sequence change for each step made by those skilled in the art without creative effort shall fall within the scope of protection of the present disclosure.

What said above are only the preferred embodiments of the present disclosure, and it should be mentioned that many improvements and modifications can be made by those skilled in the art within the principle of the present disclosure and shall fall within the scope of protection of the present disclosure.

What is claimed is:

1. A method for forwarding a multimedia message, comprising:
    receiving, by a gateway, a compressed multimedia message from a terminal;
    parsing, by the gateway, the compressed multimedia message to acquire a compression type parameter which is adopted for the compression at the terminal and is carried in the compressed multimedia message;
    decompressing, by the gateway, the compressed multimedia message according to the compression type parameter to obtain a decompressed multimedia message; and
    sending the decompressed multimedia message to a Multimedia Messaging Service (MMS) center.

2. The method for forwarding a multimedia message according to claim 1, wherein decompressing, by the gateway, the compressed multimedia message according to the compression type parameter comprises:
    looking for, by the gateway, a compression/decompression engine in compression/decompression engines pre-provided in an engine library according to the compression type parameter, and calling the found compression/decompression engine to decompress the compressed multimedia message.

3. An apparatus for forwarding a multimedia message, comprising:
    a transceiver,
        which is configured to receive a compressed multimedia message from a terminal and to send a decompressed multimedia message to a Multimedia Messaging Service (MMS) center;
    a processor; and
    a memory storing programming instructions executable by the processor;
        wherein the processor is configured to execute the stored programming instructions to perform steps comprising:
        parsing the compressed multimedia message to acquire a compression type parameter which is adopted for the compression at the terminal and is carried in the compressed multimedia message; and
        decompressing the compressed multimedia message according to the decompression type parameter to obtain the decompressed multimedia message.

4. The apparatus for forwarding a multimedia message according to claim 3, further comprising a first engine library which is pre-provided with various compression/decompression engines and corresponding compression type parameters;
    wherein in order to decompress the compressed multimedia message according to the compression type parameter, the processor is configured to:
        look for a compression/decompression engine in the first engine library according to the compression type parameter, and call the found compression/decompression engine to decompress the compressed multimedia message.

5. A method for forwarding a multimedia message, comprising:
    receiving, by a gateway, a multimedia message downloading request from a terminal;
    parsing, by the gateway, the multimedia message downloading request to acquire a compression type parameter which is supported by the terminal and is carried in the multimedia message downloading request, and recording the compression type parameter;
    removing, by the gateway, the compression type parameter from the multimedia message downloading request to obtain a multimedia message request from which the compression type parameter has been removed, and sending the multimedia message request to a Multimedia Messaging Service (MMS) center; and receiving, by the gateway, a multimedia message requested by the terminal and fed back from the MMS center, compressing the multimedia message fed back from the MMS center according to the compression type parameter, and forwarding the compressed multimedia message to the terminal.

6. The method for forwarding a multimedia message according to claim 5, wherein the multimedia message downloading request further carries an identifier of the terminal sending the multimedia message downloading request;

correspondingly, parsing, by the gateway, the multimedia message downloading request to acquire the compression type parameter which is supported by the terminal and is carried in the multimedia message downloading request and recording the compression type parameter comprises:

parsing, by the gateway, the multimedia message downloading request to acquire the compression type parameter supported by the terminal and the identifier of the terminal which are carried in the multimedia message downloading request, and recording the identifier of the terminal, the compression type parameter and a corresponding relationship between the identifier of the terminal and the compression type parameter.

7. The method for forwarding a multimedia message according to claim 6, wherein compressing, by the gateway, the multimedia message fed back from the MMS center according to the compression type parameter comprises:

looking for, by the gateway, a compression/decompression engine in various compression/decompression engines pre-provided in an engine library according to the compression type parameter, and calling the found compression/decompression engine to compress the multimedia message fed back from the MMS center.

8. An apparatus for forwarding a multimedia message, comprising:

a transceiver, which is configured to receive a multimedia message downloading request from a terminal, to send the multimedia message request to a Multimedia Messaging Service (MMS) center, to receive a multimedia message requested by the terminal and fed back from the MMS center, and to forward a compressed multimedia message to the terminal;

a processor; and a memory storing programming instructions executable by the processor;

wherein the processor is configured to execute the stored programming instructions to perform steps comprising:

parsing the multimedia message downloading request to acquire a compression type parameter which is supported by the terminal and is carried in the multimedia message downloading request, and recording the compression type parameter;

removing the compression type parameter from the multimedia message downloading request to obtain a multimedia message request from which the compression type parameter has been removed; and compressing the multimedia message fed back from the MMS center according to the compression type parameter.

9. The apparatus for forwarding a multimedia message according to claim 8, wherein the multimedia message downloading request further carries an identifier of the terminal sending the multimedia message downloading request; and wherein in order to parse the multimedia message downloading request to acquire the compression type parameter which is supported by the terminal and is carried in the multimedia message downloading request and recording the compression type parameter, the processor is configured to:

parse the multimedia message downloading request to acquire the compression type parameter supported by the terminal and the identifier of the terminal which are carried in the multimedia message downloading request, and record the identifier of the terminal, the compression type parameter and a corresponding relationship between the identifier of the terminal and the compression type parameter.

10. The apparatus for forwarding a multimedia message according to claim 8, further comprising a second engine library which is pre-provided with various compression/decompression engines and corresponding compression type parameters;

wherein in order to compress the multimedia message fed back from the MMS center according to the compression type parameter, the processor is configured to:

look for a compression/decompression engine in the second engine library according to the compression type parameter, and call the found compression/decompression engine to compress the multimedia message fed back from the MMS center.

* * * * *